(12) United States Patent
Pockett (10) Patent No.: US 8,587,638 B2
(45) Date of Patent: Nov. 19, 2013

(54) SUPPORTING A 3D PRESENTATION

(75) Inventor: Lachlan Pockett, Hervanta (FI)

(73) Assignee: Nokia Corporation, Espoo (FI)

( * ) Notice: Subject to any disclaimer, the term of this patent is extended or adjusted under 35 U.S.C. 154(b) by 916 days.

(21) Appl. No.: 12/311,303

(22) PCT Filed: Sep. 25, 2006

(86) PCT No.: PCT/IB2006/053467
§ 371 (c)(1),
(2), (4) Date: Nov. 3, 2009

(87) PCT Pub. No.: WO2008/038068
PCT Pub. Date: Apr. 3, 2008

(65) Prior Publication Data
US 2010/0091097 A1    Apr. 15, 2010

(51) Int. Cl.
*H04N 13/04* (2006.01)
(52) U.S. Cl.
USPC .............................................. 348/51; 348/54

(58) Field of Classification Search
USPC ..................................................... 348/51–60
See application file for complete search history.

(56) References Cited

U.S. PATENT DOCUMENTS

| 5,847,870 A | 12/1998 | Ohtsuka et al. |
| 2005/0195477 A1 | 9/2005 | Kornfeld |
| 2007/0248260 A1 | 10/2007 | Pockett |

FOREIGN PATENT DOCUMENTS

WO   WO 2007/057497   5/2007

*Primary Examiner* — Hieu Hoang
(74) *Attorney, Agent, or Firm* — Alston & Bird LLP (57) ABSTRACT

For reducing the effect of reverse half-occlusion in a 3D presentation on a screen, a virtual window is created in front of the screen. The screen is to be used for combining a left image and a right image for the 3D presentation. The virtual window is created by removing image data at a left edge of the left image and at a right edge of the right image before combining the left image and the right image on the screen.

17 Claims, 9 Drawing Sheets

Perception left eye

Perception right eye

Fig. 9 ents it be tagged blank due to image constraints.

SUPPORTING A 3D PRESENTATION

CROSS REFERENCE TO RELATED APPLICATIONS

This application is the U.S. National Stage of International Application Number PCT/IB2006/053467 filed on Sep. 25, 2006 which was published in English on Apr. 3, 2008 under International Publication Number WO 2008/038068.

FIELD OF THE INVENTION

The invention relates to a method for supporting a three-dimensional presentation, which presentation combines at least a left image and a right image. The invention relates equally to a corresponding apparatus, to a corresponding device and to a corresponding computer program code and computer program product.

BACKGROUND OF THE INVENTION

When an observer is looking at a real scene, a first two-dimensional (2D) image is seen by the left eye of the observer and a second 2D image is seen by the right eye of the observer. Only the brain fuses this pair of 2D images into a three-dimensional (3D) scene. By replicating such a perception of different views on a scene by means of a display, it is possible to fool the brain into perceiving a 3D scene as if it was actually receiving images of a real scene and not of the screen of a display.

For producing a 3D effect, stereoscopic and multi-view displays thus send a different two-dimensional (2D) image of a scene to the left eye and to the right eye of an observer. The 2D images comprise small horizontal differences in the location of points in the scene. This allows the brain to fuse the two 2D images into a single perceived 3D scene, in which the objects have a perceived depth which is related to the disparity between the 2D images seen by the eyes.

A 3D presentation by a display, however, may comprise inconsistencies and artefacts, which are not existent in real scenes. Such inconsistencies and artefacts cause strain on the brain and may result in fatigue, eye strain, headaches and fusion problems.

The three most significant causes of eye strain and fusion problems with stereoscopic displays arise from accommodation-convergence mismatch, misalignment and reverse half-occlusions. With stereoscopic displays, the eyes focus on the display but converge to a distance out of the display, which causes a difference between accommodation and convergence. Such an accommodation-convergence mismatch can be controlled by controlling the disparity in the content. Misalignment between the views in a pair of 2D images cause a range of effects ranging from perceived depth space warping to fusion problems and should be corrected in a suitable manner. The present document focuses on the third problem of reverse half-occlusions.

Occlusions occur naturally in real scenes, in which a near object blocks an object that is farther away from the observer. For example, when the observer is looking at the right edge of a near object, the object partially blocks the view to the background for the left eye, while the right eye can see around the object seeing some of the background that is blocked for the left eye. The brain uses this discrepancy as a depth indicator indicating that the background object continues behind the front object.

Figure 1A:
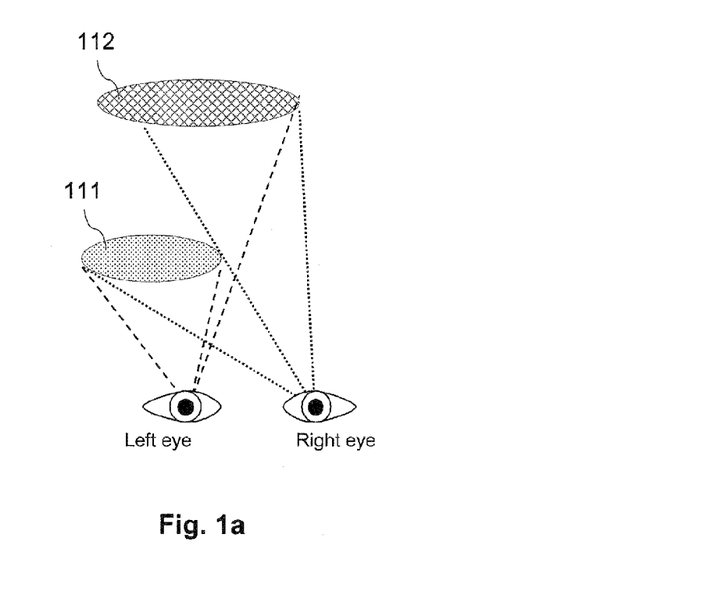
FIGS. 1a and 1b are schematic diagrams illustrating occlusion.
Figure 1B:
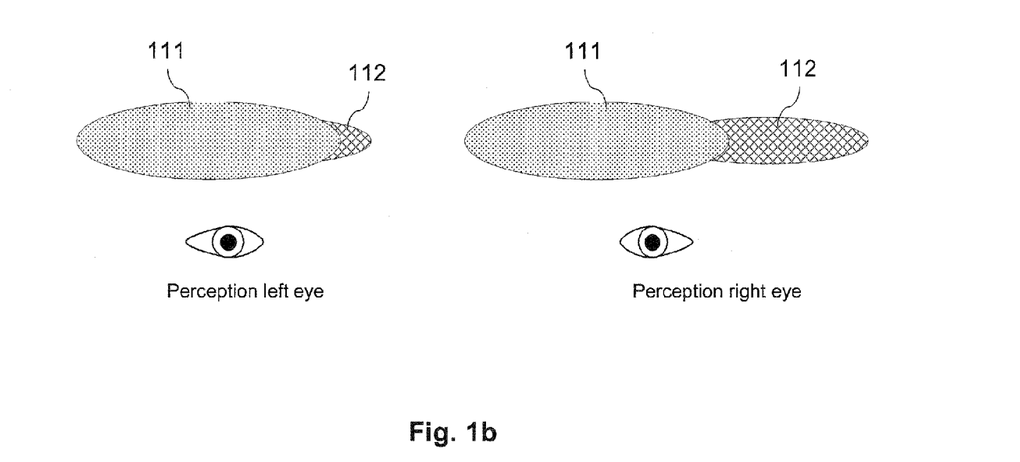

For illustration, FIG. 1*a* schematic presents a situation, in which a first object 111 is placed in front of a second object 112 from the point of view of an observer. FIG. 1*b* presents in addition on the left hand side the 2D image of the two objects 111, 112 as perceived by the left eye of the observer, and on the right hand side the 2D image of the two objects 111, 112 as perceived by the right eye of the observer.

The brain uses a number of depth indicators to create a perceived 3D scene from the two 2D images coming to the left and right retina. The most important depth indicator is horizontal disparity, which means that the left eye and the right eye perceive the visible edges of the objects of a scene at horizontally shifted locations. The simple fact that object 111 blocks the view to object 112 and that there is an area of object 112 that can only be seen by the right eye while being occluded for the left eye gives the brain in addition an indication that object 111 must be in front of object 112.

Figure 2A:
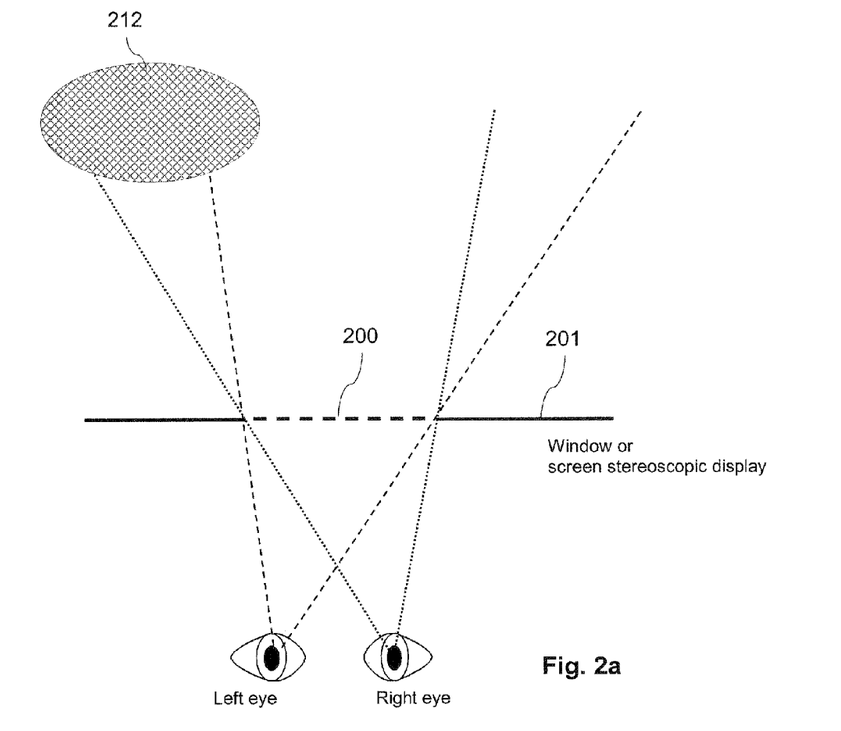
FIGS. 2a and 2b are schematic diagrams illustrating occlusion by a wall surrounding a window or the boundaries of a screen.
Figure 2B:
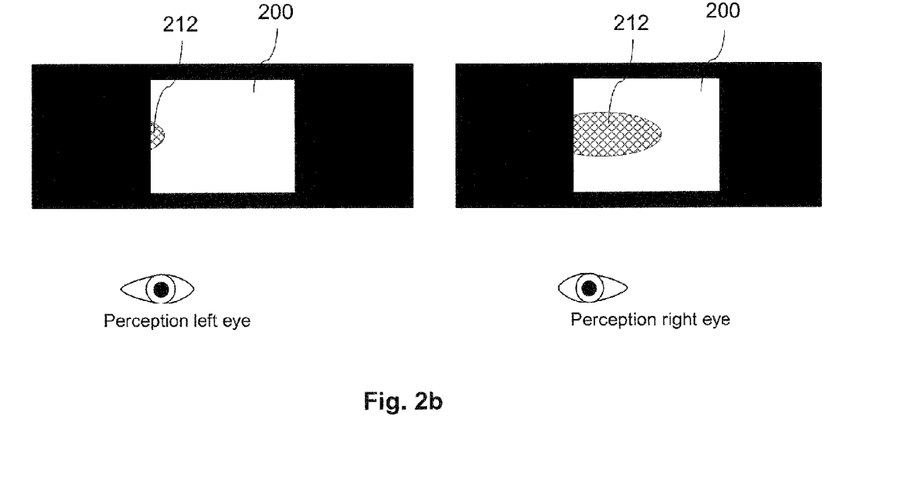

FIG. 2*a* schematically presents a similar situation, in which an observer looks at an object 212 through a window 200 in a wall 201, the object 212 being partially occluded by the wall 201. FIG. 2*b* presents on the left hand side the 2D image of the window 200 and the object 212 as perceived by the left eye of the observer, and on the right hand side the 2D image of the window 200 and the object 212 as perceived by the right eye of the observer.

The wall 201 blocking the view to the object 212 is an indicator that the window 200 is in front of the object 212. In addition, more of the object 212 is visible for the right eye than for the left eye, which provides a further indication that the object 212 is located behind the window 200.

A corresponding situation occurs in a presentation on a stereoscopic or multi-view screen, if a virtual object is located in the rear half of the virtual space, that is, behind the screen. For the illustration of such a situation, the window 200 of FIGS. 2*a* and 2*b* can be viewed as a screen of a stereoscopic display and object 212 can be viewed as a virtual object. In this case, the convergence, disparity and occlusion information all agree with each other and so the brain perceives the virtual 3D object 212 at a larger distance than the screen 200.

In the real world, objects can only occlude other objects that are located behind them. An object cannot occlude another object that is located in front of it. This is illustrated in FIGS. 3*a* and 3*b*.

Figure 3A:
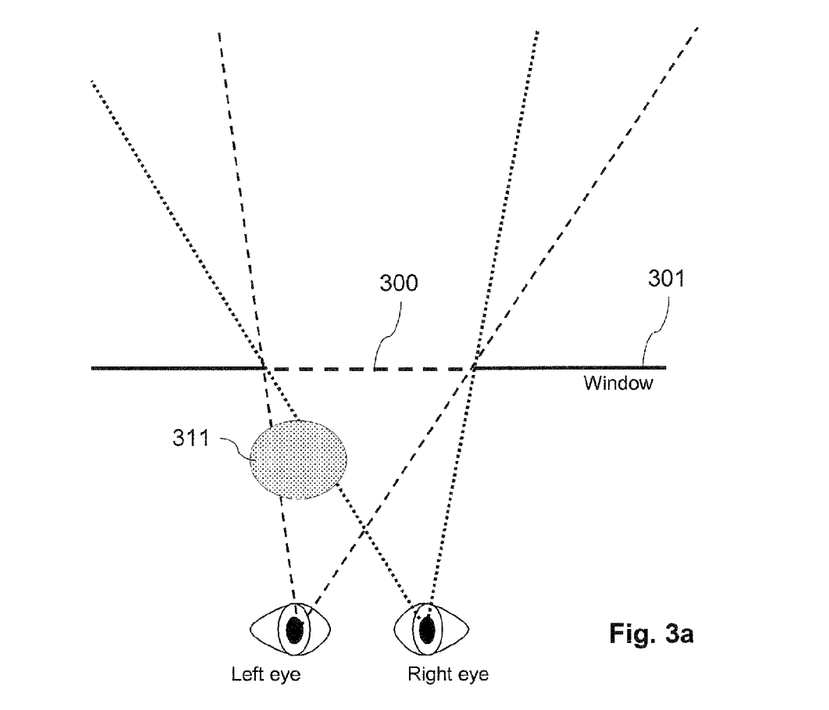
FIGS. 3a and 3b are schematic diagrams illustrating the perception of a real object located in front of a window.
Figure 3B:
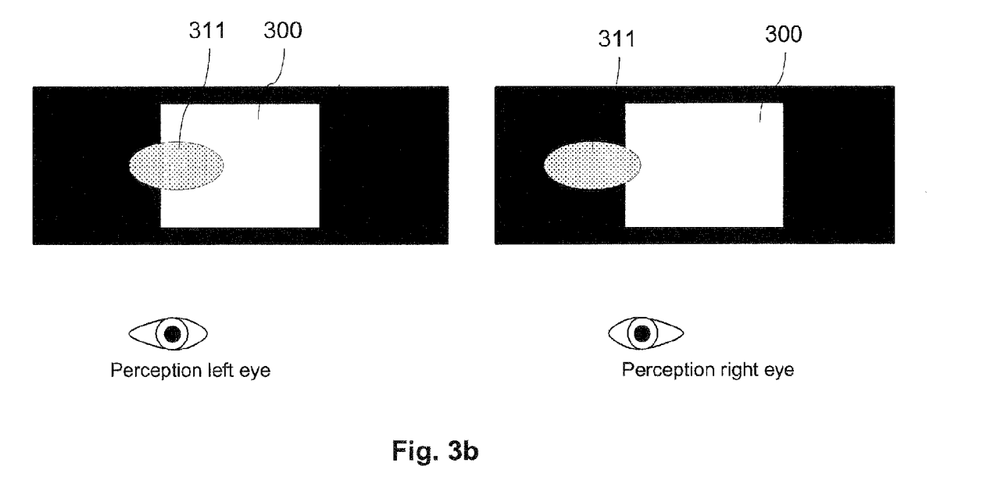

FIG. 3*a* schematically presents a situation, in which an observer looks at a real object 311 in front of a window 300 in a wall 301. FIG. 3*b* presents on the left hand side the 2D image of the window 300 and the object 311 as perceived by the left eye of the observer, and on the right hand side the 2D image of the window 300 and the object 311 as perceived by the right eye of the observer.

Since the object 311 is located in front of the window 300, it blocks out the view to a part of the window 300 and of the wall 301.

Moreover, the eyes converge on one object, for instance object 311, causing zero retinal disparity between the eyes at the point of convergence where the object falls in the middle of both eyes. In other areas of the view, another object, for instance the wall 301, is noticed at a different depth. The difference in depth is picked up by the retinal disparity between the edges detected for the second object. In the presented situation, the disparity gives an accurate measure of how far the object 311 is in front of the window 301. The eye muscle tension gives in addition an overall global depth estimate.

The resulting occlusion and depth information all match with what the brain is used to.

With stereoscopic or multi-view displays, in contrast, a problem of reverse half-occlusions may occur, whenever an object that is perceived to be located in front of the display touches the edge of the screen. The problem of reverse half-occlusions is illustrated in FIGS. 4a and 4b.

Figure 4A:
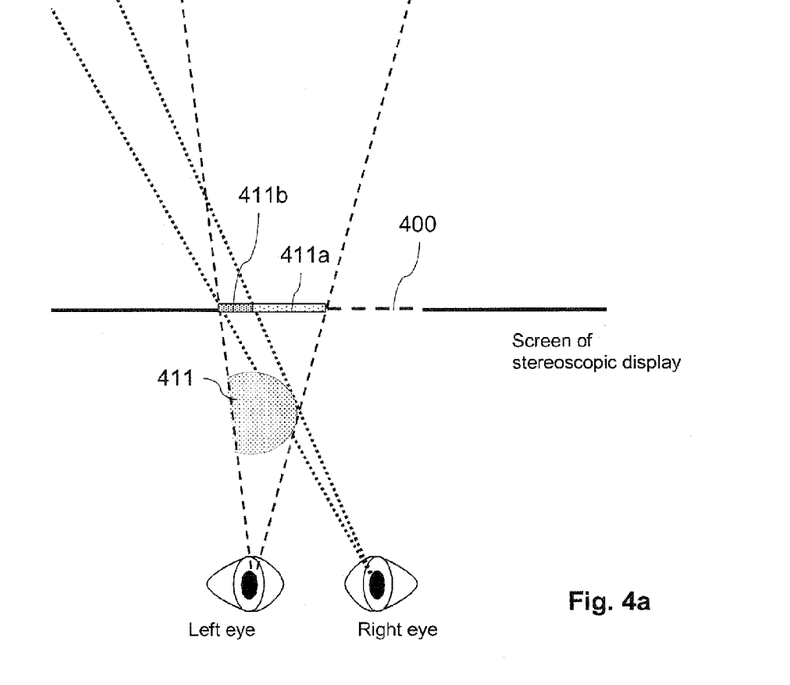
FIGS. 4a and 4b are schematic diagrams illustrating reverse half-occlusion resulting when a virtual object in front of a screen exits the screen space.
Figure 4B:
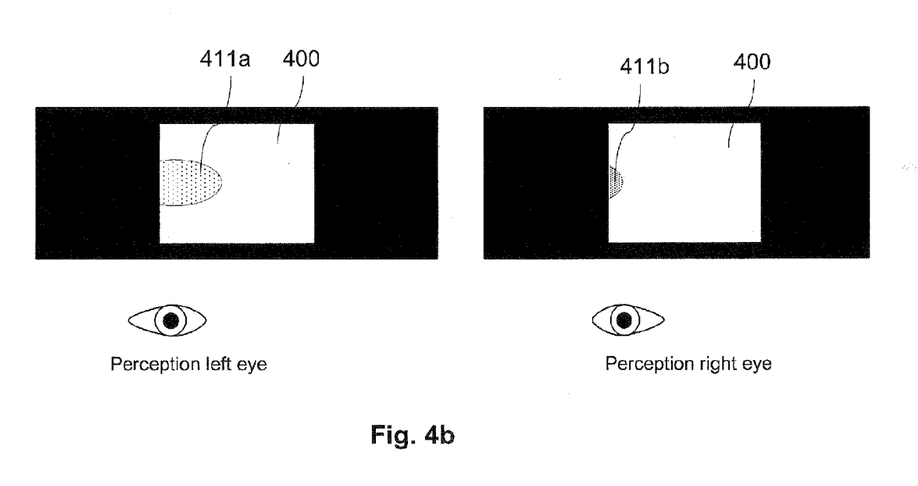

FIG. 4a schematically presents a situation, in which an observer looks at a virtual object 411 in front of a screen 400 of a stereoscopic or multi-view display. The virtual object 411 is constructed in the brain of an observer from an object 411a in a left image presented on the screen 400 and from an object 411b in a right image presented on the screen 400. Object 411a and 411b are the same, but horizontally shifted against each other so that object 411b is cut off to a larger extent by the left edge of the screen 400 than object 411a. FIG. 4b presents on the left hand side the 2D image of the screen 400 and of the object 411a as perceived by the left eye of the observer, and on the right hand side the 2D image of the screen 400 and of the object 411b as perceived by the right eye of the observer.

In the depicted situation, the right eye thus sees less of the object 411 than the left eye. The brain picks up this disparity information from the left image and the right image, which indicates to the brain that the object 411 is closer to the observer than the screen 400. However, the virtual object 411 is cut off by the left edge of the screen 400, and thus the virtual object 411 is only partly visible. As a result, the border of the screen 400 seems to block the view onto the object 411, indicating to the brain that the screen 400 must be in front of the object 411.

This phenomenon, in which disparity information indicates that an object is in front of a screen, but in which the border of the screen seems to partly occlude the object, is referred to as reverse half-occlusion. Such a conflict between different depth indicators is a contradiction to the laws of viewing geometry that the human brain is used to experiencing in the real world, which causes binocular rivalry creating difficulties in seeing the scene clearly. Binocular rivalry may cause eye strain, nausea, disorientation and other adverse symptoms which lead to a less enjoyable viewing experience. Anomalies in the image tend to attract the observers attention to the area in an attempt for the brain to solve the discrepancy. The effect of reverse half-occlusion is also referred to as reverse occlusion or as a window violation.

3D content creators may limit the effect of reverse half-occlusions in their content.

This could be achieved for instance by limiting the forward disparity to ensure that no object in front of the screen touches the edge of the screen. The comfortable viewing space (CVS) is defined as the 3D space in front and behind the screen that virtual objects are allowed to be in and be comfortably viewed by the majority of individuals. Limiting the forward disparity thus reduces the usable 3D space to one half.

Further, content could be artificially created such that it does not cause any window violations by making objects move to the rear half of the viewing space before they enter or exit the scene. Further, an object could be made to enter or exit the scene so quickly that the brain is not able to notice the window violation. Both approaches limit the freedom of designing content, though.

SUMMARY

The invention allows removing or reducing the effect of reverse half-occlusion from 3D presentations.

A method is proposed, which comprises preparing a creation of a virtual window in front of a screen. The screen is to be used for combining a left image and a right image for a three-dimensional presentation. The creation of the virtual window is prepared by removing image data at a left edge of the left image and at a right edge of the right image. The resulting left image and the resulting right image are then provided for a three-dimensional presentation.

Moreover, an apparatus is proposed, which comprises a processing component. The processing component is configured to prepare a creation of a virtual window in front of a screen, where the screen is to be used for combining a left image and a right image for a three-dimensional presentation, by removing image data at a left edge of the left image and at a right edge of the right image. The processing component is further configured to provide the left image and the right image for a three-dimensional presentation.

The processing component can be implemented in hardware and/or software. If implemented in hardware, the processing component could belong for example to a chip or chipset, for instance in the form of circuitry in an integrated circuit. If implemented in software, the processing component could be for instance a processor in combination with a corresponding computer program code.

The apparatus could be for instance a chip, a display module or an entity comprising such a display module, etc.

Moreover, a device is proposed, which comprises the proposed apparatus and a user interface.

Moreover, a computer program code is proposed, which realizes the proposed method when executed by a processor.

Finally, a computer program product is proposed, in which such a program code is stored in a computer readable medium. The computer program product could be for example a separate memory device, or a memory that is to be integrated in an electronic device.

The invention proceeds from the consideration that the addition of a neutral strip on the left side of a left image and of a neutral strip on the right side of a right image effectively changes the perceived depth of a screen that is used for a 3D presentation based on the left and the right image. Such added neutral strips move the perceived screen closer to the observer so that the observer has the impression of looking at the 3D scene through a virtual window that is closer to her or him than the actual screen. This effectively changes the depth of occlusion-queue of the edge of the screen to be closer to the observer. When objects enter or exit the screen at a virtual depth in front of the actual screen, they may still be behind the occlusion depth of the virtual window, and hence not cause any reverse half-occlusions. It is therefore proposed to remove image data from the left edge of the left image and the right edge of the right image, in order to generate such neutral strips. The virtual window in front of the screen will also be referred to as virtual occlusion window.

Since the virtual window is fusible in front of a reverse half-occlusion, the invention is suited to reduce or to remove the occurrence of reverse half-occlusions, even in case objects perceived in front of the real screen are allowed to freely enter and exit the scene. This enables a fuller utilization of both frontal and rear viewing spaces. The 3D depth of a presented scene may be doubled, which doubles the effect of a 3D presentation. Alternatively or in addition, this allows more artistic freedom in content creation, hence enhancing the use of the virtual 3D space. Further, the avoidance of reverse half-occlusions removes a significant cause of eye strain, making 3D presentations easier to view. Several studies on the visual system further indicate that when there are conflicts in perception, the brain is not able to create a good 3D perception of a scene and flattens it to a 2D perception.

The images with the removed data are combined for a presentation without associated shifting. Thus, the disparities in the scene remain constant, and there is no physical change in the centre of the screen. It has to be noted, though, that additional cropping and Euclidian shifting may be applied to the images for changing the disparity in the 3D presentation in a desired manner.

If the edges of the images are simply cropped for removing the image data, the added neutral strips are usually black or almost black strips. Black strips are best achieved with low crosstalk displays, as crosstalk will prevent the strips from being truly black and thus from fusing easily with the edge of the display.

It has to be noted, though, that the described effect may also be achieved with strips of other colors than black. To this end, image data may be removed by replacing the left edge of the left image and the right edge of the right image by a respective strip of a predetermined color and pattern.

For example, if the frame of a screen is not black, using black strips might result in problems with the fusion of the strip. Coming in further from the edge of the screen a bit might overcome fusion problems, as the double image on the screen will not be quite as close to the active area of viewing. Strips matching the appearance of the frame of the screen allow a fusion between the strip in one image and the corresponding edge of the frame of the screen, and result thus in a better artificial window to fuse. The human brain uses edges to work out where objects are. Especially predominant edges like the generated strip or the frame of the screen are made a reference point that the brain will match rapidly, before working out small details of the 3D space from smaller, less predominant edges, contours and texture.

The perception of the entire scene may change when adding the strips. The addition of strips matching the color of a frame or of another type of background surrounding the 3D presentation means that the eyes initially fuse the entire images with each other by matching the backgrounds, and then look at the individual content. Hence the strips may change the convergence amount when the eyes fuse the images, meaning that the relative disparities of the background scene in the image is perceived to have a bigger negative disparity relative to the eyes convergence point.

By selecting the width of added strips to be sufficiently small, it can be ensured that fusion is possible. By selecting the width of added strips at the same time to be sufficiently large, the reverse occlusion area can be covered, creating a 3D interpretable monocular area that replaces the reverse half-occlusion artifact.

In yet another embodiment, one of the images could be provided with some sort of a thin border along its edges, which matches the neutral strip in color and pattern. This would provide an artificial edge of the screen that is more predominant and can thus be fused more easily and give a better indicator. The reason is that eyes predominantly fuse larger areas and converge to the larger area of matching, and then they see all objects as a relative disparity from what they fused. Thus, the eyes actually fuse the edge of the screen in one image with the neutral strip of the other image, making the strip vanish and the edge of the screen appear closer.

It might be noted that an occlusion window creates a monocular area next to a binocular area. The depth localization of objects in the monocular area gets linked to the depth localization of objects in the binocular area. For example, if an object is half in the monocular area, then the depth localization will be perceived in 3D at the depth of their part of the object in the binocular area. Hence a 3D interpretation is generated in the monocular zone from information drawn from the binocular zone, along with the other standard monocular queues such as texture gradient, sharpness, object recognition etc.

When there is an anomaly, the eye tends to focus on that area, because a viewer notices subconsciously that something is wrong. Such an anomaly is also present in the area of a reverse half-occlusion, so that the eyes of a viewer are drawn to this particular area.

In a further embodiment, an additional strip of any colour, width and texture is added to both edges of both images to increase the contrast of the border of the viewing region and thus to create a better fusion lock on the edges. On the cropped edges, the additional strip is added more specifically at the junction between the cropped part and the remaining image data part. Alternatively, a band of any colour, width and texture could be added for the same purpose along the border of the respective area of both images containing image data. Fusion is needed between the edge of the strip and the edge of the screen to create an artificial occlusion window. When a good fusion lock is obtained then the user will not notice the strips, whereas when a fusion lock is not obtained—for example because there is too much cross talk, because the strips do not match the edge of the screen, or because the disparity is too large on the strips—then the strips will disturb the scene, as the eyes will fuse the standard image like normal and the strips will effectively be a disturbance on the edge of the scene. The additionally added strips or bands thus function as a fusion lock, as they match the disparity of the artificial viewing window, but add extra contrast and/or texture to the edge of the viewing area, which matches between the two eyes. Adding a matching color or texture may improve the image matching process between the eyes significantly.

Added borders and strips can also be used artistically, as they change the feeling of the scene.

In one embodiment of the invention, it is further detected whether the left image and the right image represent an object that would be perceived in front of the screen in the three-dimensional presentation. The creation of a virtual window in front of the screen could then be prepared only in case a representation of such an object is detected. It could moreover be detected whether an object perceived in front of the screen would touch an edge of the screen in the 3D presentation. It would then be possible to limit the removal of image data to those cases, in which such an object touching an edge of the screen is detected. It is to be understood that in this case, it is irrelevant whether first objects are detected which would be perceived in front of the screen and then whether these objects touch an edge of the screen, or whether first objects are detected which touch an edge of the screen and then whether these objects would be perceived in front of the screen.

When a desired perceived depth of the virtual window is known, the display geometry can be used for calculating the required amount of image data that is to be removed. The selected amount could be fixed or flexible.

A fixed amount could be defined for example by display specifications, or the 3D content author could specify it when creating a dynamic movie etc.

In one embodiment, an amount of image data is selected, which results in a predetermined perceived depth of the virtual window. The predetermined perceived depth could correspond for example to about 60% of a maximum allowed positive disparity for the employed screen. It is to be understood that any other value could be selected as well, for instance a value between 40% and 80% of a maximum allowed positive disparity or any other value. Usually, the allowed positive disparity will be suited to cover to the regular frontal comfortable viewing space in front of a respective screen, and thus, a selected percentage of the maximum allowed positive disparity corresponds to the same percentage of the regular frontal comfortable viewing space. It has to be noted, though, that the comfortable viewing space depends not only on the display, but also on the human eye separation, the viewing geometry, the diopter range of the eyes of a respective viewer, the display distance, etc. The viewing distance has a large influence, since the change in angle that the eye detects and which depends on the viewing distance is important for indicating a relative change in depth. A changing viewing distance also changes the diopter limits, etc.

Setting the perceived depth of the virtual window to the front of the CVS would totally remove any reverse half-occlusions. Still, this approach may result in troubles when an observer fuses on the edge of the screen. Moreover, the reduction in the effective width of the presentation increases with an increasing shift of the perceived depth of the virtual window compared to the actual screen. To avoid these problems, some intermediate depth value for the virtual window may be implemented. By setting the intermediate value for example to 60% of the frontal CVS, objects in the range of 60% of the frontal CVS to 100% of the back CVS would be enabled to enter or exit the screen freely. Objects at 80% of the frontal CVS would only have a window violation in the order of 20% of the CVS, which is about ¼ of the magnitude of the violation that would occur without any removal of image data. Window violation becomes much less apparent when the amount of occlusion is smaller. Moreover, the front of the CVS is rarely reached by an object, and in particular when exiting the screen, an object will usually not be located at more then 80% of the frontal CVS.

The effect of reverse half-occlusion is related to the amount of occlusion, and different settings are appropriate for different displays. For example, small violations apparently do not cause as significant problems as larger violations, as there is some flexibility in the visual system that can accommodate very small window infringement but that clearly notices that something is wrong when there is a serious window infringement. Further, the disparity range, the CVS, the window effect, the diopter effect and numerous other factors drastically change the amount of occlusion from mobile phone displays over 3D desktop displays to 3D cinematography, etc. Therefore, the perceived depth of the virtual window is indicated in the above example to correspond to a percentage of the maximum allowed positive disparity for reasons of simplicity. On a desktop display, the CVS might allow for example a disparity range of ±10 mm, and a perceived virtual window at a distance of 6 mm from the real screen could be appropriate. A cinema might have −65 mm to +500 mm disparity, and a perceived virtual window at a larger distance from the real screen could be implemented. On a mobile phone device, the reduction of display width due to the removal of image data becomes more crucial, but on the other hand, the allowed disparity range is smaller, for example ±2 mm, so a shift of the perceived depth of the virtual window by a couple of millimeters might be appropriate, etc. It is to be understood that all numerical values mentioned in this document are only given as examples and cannot be construed as an intention to limit the scope of protection. They can rather be set to any desired value.

In one embodiment, an amount of image data that is to be removed is selected, which increases with an increasing perceived distance of the object to the screen. In this case, the amount of removed image data could be limited to a predetermined value for the above indicated reasons. The limit could be set as well to correspond to 40% to 80% of the maximum allowed positive disparity, or to any other value.

The perceived depth of the virtual window might also be controlled to create extra artistic effects by changing a widths of added strips and thus by dynamically moving the window depth throughout a movie sequence. This may allow accommodating different scenes and adding an extra feel of depth, since the observer will assume that the screen is at a constant depth. Thus, the perceived depth of the entire scene can be changed relative to the screen at the perceived depth, which the brain assumes to be the real depth of the screen.

In one embodiment, the occlusion window size can be dynamically changed in general, depending on any desired criteria.

The invention can be employed for any 3D presentation that is achieved by combining at least two images. It could be employed for example for a stereoscopic presentation or for a multi-view presentation.

If used for a multi-view presentation, the removal of image data of a respective left image and of a respective right image could be harmonized for all views of the multi-view presentation. By applying an appropriate removal of image data to each view, taking care that the screen is perceived at exactly the same depth for all views, problems due to inconsistencies in the occlusion depth between different views can be avoided.

The invention can also be employed for a display wall comprising multiple seams.

The shifting of the perceived depth of a screen may be useful, for example, in large 3D display walls, for which multiple 3D displays are placed adjacent to each other to enhance the 3D effect. The joins between the displays may produce large occlusion problems in the middle of the scene, so the occlusion window can be adapted to the edges of the displays in the 3D display wall to remove occlusion effects, giving an observer the feeling of looking through window panes. The human eye naturally filters out objects at different depths than the depth of interest. Thus, it can look past objects in the foreground to see the scene of interest, hence making the joins in the display wall less noticeable.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 5:
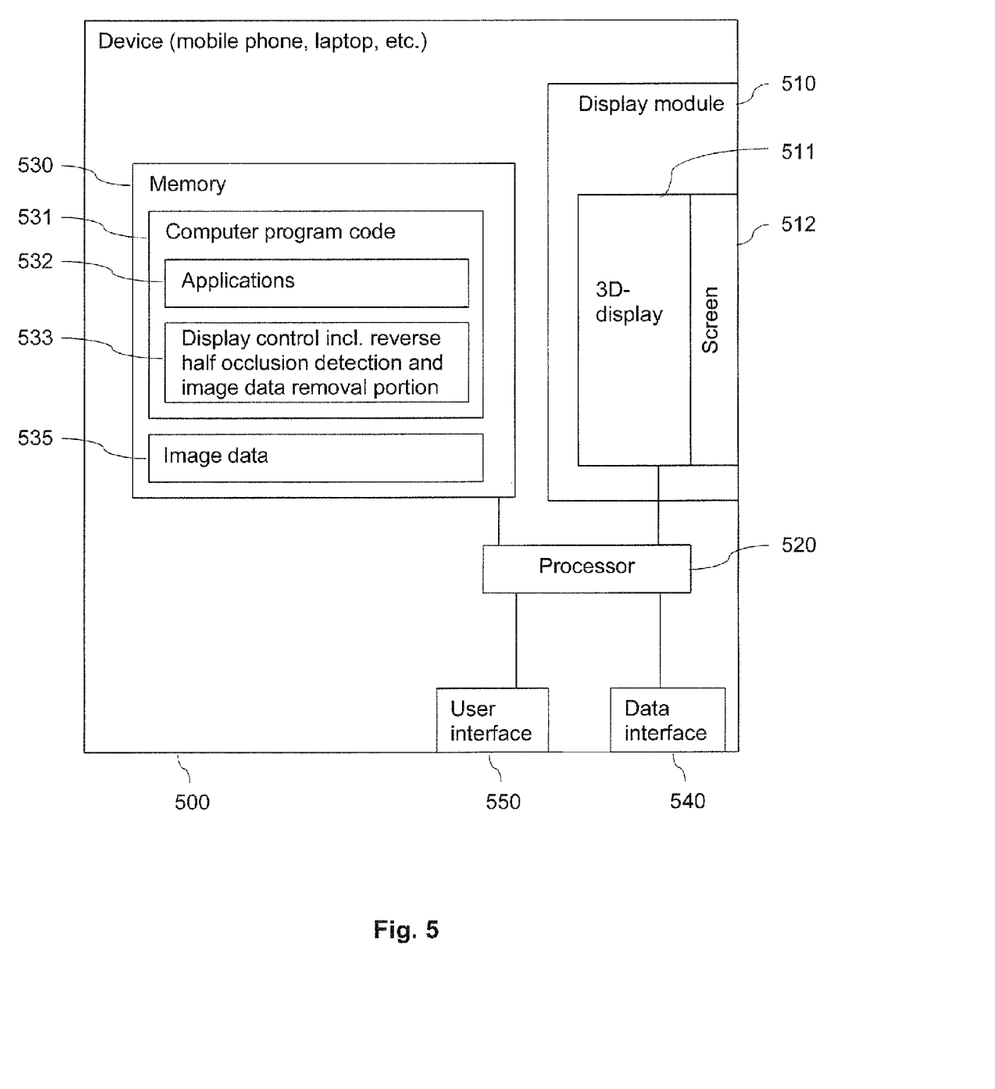
FIG. 5 is a schematic block diagram of a first device according to an exemplary embodiment of the invention.

FIG. 5 is a schematic block diagram of an exemplary device, which supports the generation of an artificial virtual occlusion window in accordance with an embodiment of the invention.

The device 500 could be for instance a mobile phone or a laptop. It comprises a display module 510 including a 3D display 511 with a screen 512. The display module 510 may comprise further components not shown explicitly, like drivers, backlight source, etc.

The device 500 comprises in addition a processor 520 and, connected to this processor 520, a memory 530, a data interface 540 and a user interfaced 550. The processor 520 connected as well to the display module 510.

It is to be understood that the device 500 could comprise various other components not shown.

The processor 520 is configured to execute computer program code.

The memory 530 comprises a storage section 531 for computer program code that may be retrieved by the processor 520 for execution. The stored code may include for example code for various applications 532. Further, it includes code for a display control 533. The code for the display control includes a part that is designed for detecting a reverse half-occlusion and for performing an image data removal to generate an artificial virtual occlusion window. The memory 530 may further comprise a storage section 535 for image data.

The generation of an artificial virtual occlusion window in the device 500 of FIG. 5 will now be described in more detail with reference to FIGS. 6, 7, 8a and 8b.

A user of the device 500 may select an offered function via the user interface 550, which causes the processor 520 to retrieve an application 532 from the memory 530 and to execute this application 532. The application 532 may require a 3D presentation of some content on the screen 512 and cause the processor 520 to retrieve the display control code 533 from the memory 530 for taking care of the presentation.

The 3D presentation can be for example a single 3D presentation or a 3D video comprising a sequence of presentations, for instance for a game. The image data for the presentation may be received, for example, from the image data storage section 535 of the memory 530 or from an external source via the data interface 540 under control of the application code 532. The image data could be provided for example by two cameras via the data interface 540. It has to be noted that the device 500 could also comprise such a set of cameras itself.

For each presentation, a left image and a right image is provided by the application 532.

Under control of the display control code 533, the processor 520 performs various operations on the images, including conventional cropping and re-sizing operations. In this scope, it also generates an artificial virtual occlusion window, if required.

Figure 6:
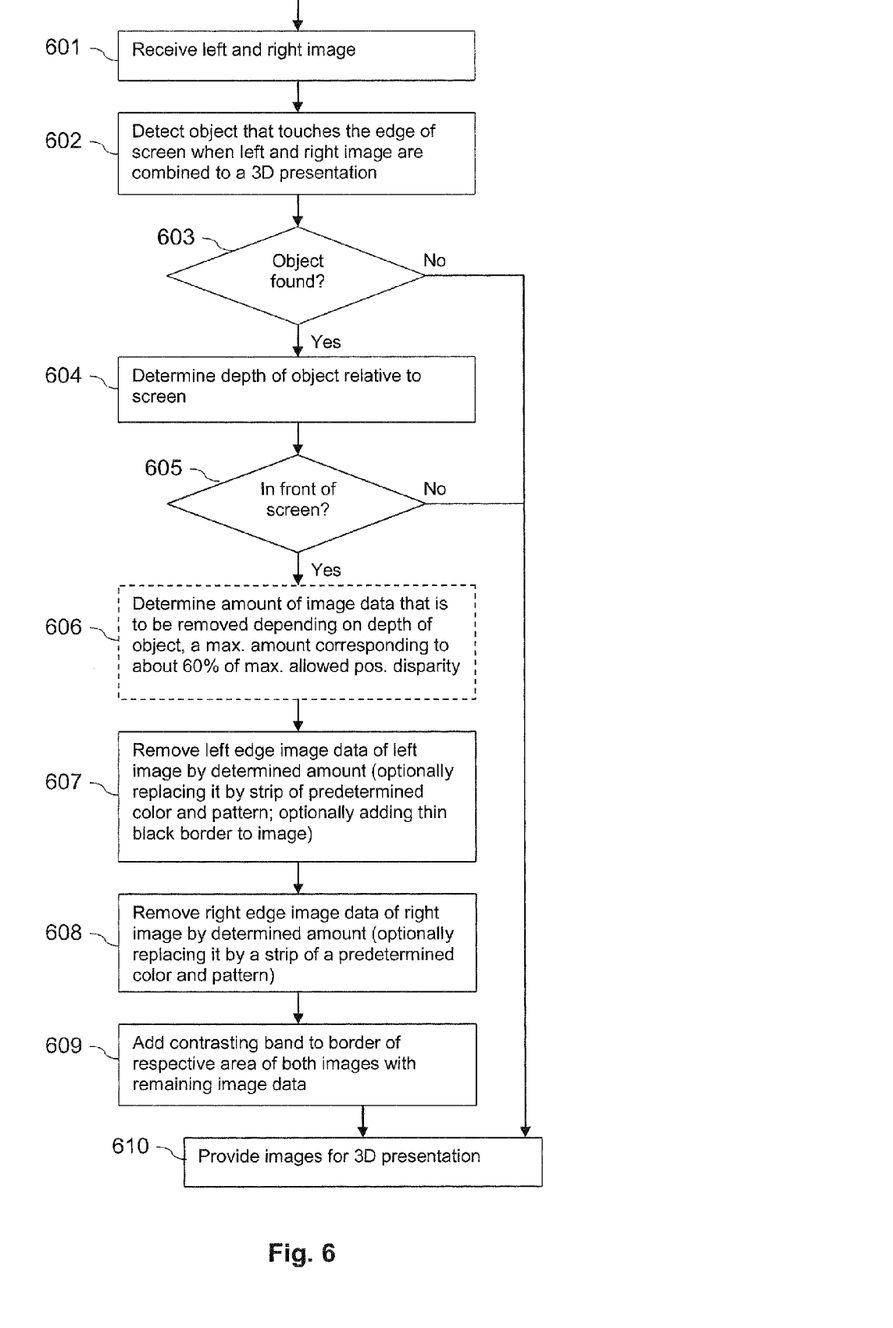
FIG. 6 is a flow chart illustrating an operation in the device of FIG. 5.
Figure 7:
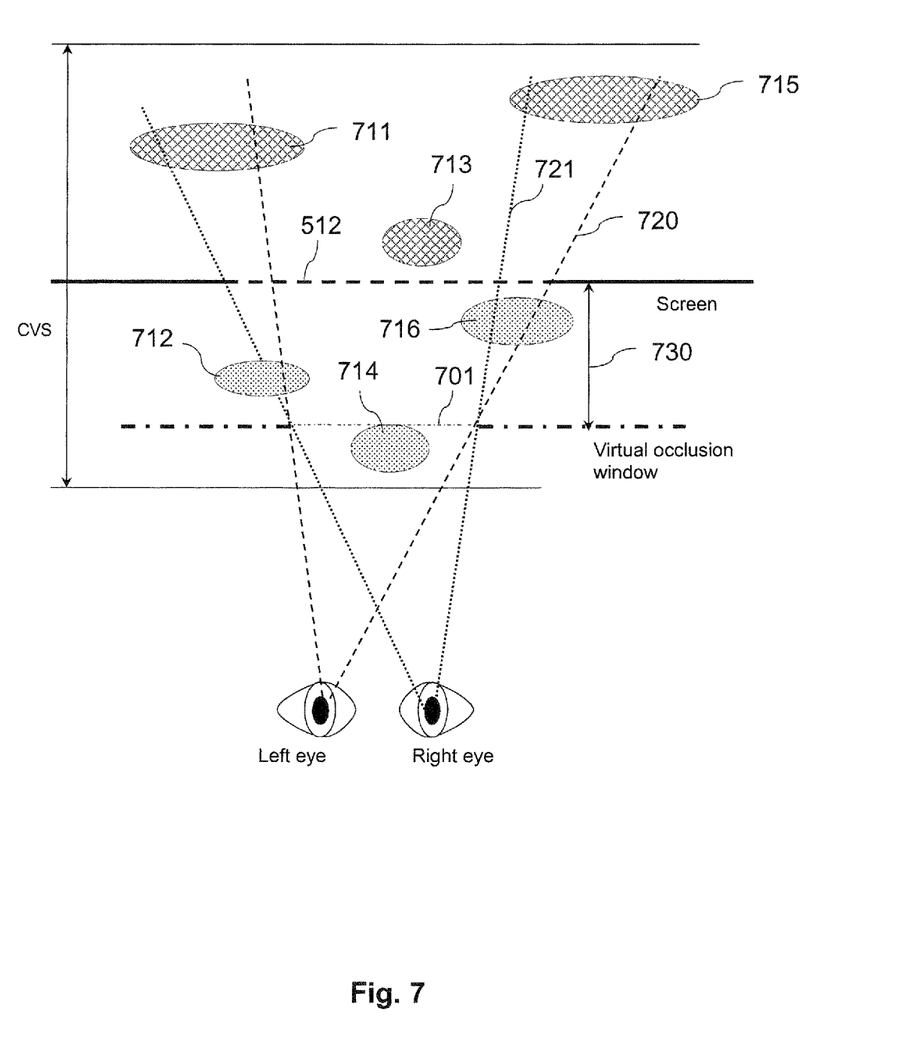
FIG. 7 is a schematic diagram illustrating removal of image data in the operation of FIG. 6 and an allowable exit/entrance space in front of the screen.

FIG. 6 is a flow chart illustrating specifically a generation of an artificial virtual occlusion window. FIG. 7 is a schematic diagram of an exemplary 3D presentation, which is used for explaining some of the details in this process. Any object 711-716 of a 3D presentation presented on the screen 512 may be perceived at the depth of the screen 512, behind the screen 512 or in front of the screen 512. The image data will usually be designed such that the perceived distance of any object 711-716 from the screen 512 lies in both directions within the comfortable viewing space (CVS) of the specific display, providing appropriate disparity ranges for the display.

The processor 520 receives a current set of images (step 601) and detects any object in this set of images that would touch the left or the right edge of the screen 512 when used for a 3D presentation (step 602).

In the example of FIG. 7, objects 711 and 712 would touch the left edge of the screen 512, while objects 715 and 716 would touch the right edge of the screen 512. Objects 713 and 714 would not touch a lateral edge of the screen 512.

If no object that would touch an edge of the screen 512 is detected (step 603), the images are provided for storage and/or a 3D presentation, possibly after some other pre-processing operations (step 610).

In case an object is detected that would touch the left or the right edge of the screen 512 when used for a 3D presentation (step 603), the processor 520 determines a perceived depth of such an object in a 3D presentation in relation to the screen 512 (step 604).

In the example of FIG. 7, thus the perceived depth of objects 711, 712, 715 and 716 is determined. The perceived depth of objects 711 and 715 is larger than the depth of the screen 512, that is, they are perceived to lie behind the screen 512. The perceived depth of objects 712 and 716 is shorter than the depth of the screen 512, that is, they are perceived to lie in front of the screen 512.

If all objects touching an edge of the screen 512 are detected to be perceived to lie behind the screen 512 (step 605), reverse half-occlusion does not occur. Thus, the images are provided for storage and/or a 3D presentation, possibly after some other pre-processing operations (step 610)

In case at least one object touching a lateral edge of the screen 512 is detected to be perceived to lie in front of the screen 512 (step 605), as objects 712 and 716 in the case of FIG. 7, the perceived depth of the screen 512 is shifted to lie closer to the observer by removing image data from the left edge of the left image and from the right edge of the right image.

To this end, at first the optimal amount of removed image data is determined, depending on the determined depth of the object that is perceived to lie closest to the observer (step 606).

The removal of image data causes the screen to be perceived closer to the observer so that it may function as an artificial virtual occlusion window. The amount of removed image data is selected such that the resulting perceived depth of the screen 512 is shorter than the perceived depth of the object that is perceived to lie closest to the observer. In order to avoid troubles when fusing on the edge of the screen 512 and in order to avoid a too significant reduction of the effective display width, however, the artificial virtual occlusion window is allowed to be placed at a maximum to a distance from the real screen 512, which corresponds to about 60% of the maximum allowed positive disparity. In the case of a laptop allowing a maximum disparity of ±10 mm, for example, this might be in the order of 6 mm in front of the real screen 512. Since the allowed positive disparity is assumed to cover basically the entire frontal CVS, 60% of the maximum allowed positive disparity correspond at the same time to about 60% of the frontal CVS.

In the example of FIG. 7, object 712 is perceived to lie closest to the observer. The amount of removed image data is selected such that the resulting perceived depth of the screen 512 is shorter than the perceived depth of the closest object 712, resulting in an artificial virtual occlusion window 701. In an example, which is not to be construed to be limiting in any way, a mobile phone could have for instance disparities of up to ±1 mm or ±2 mm, and the selected width of removed image data could be for instance up to 1 mm or 2 mm for each image. In another example, which is equally not to be construed to be limiting in any way, a laptop could have for instance disparities of up to ±10 mm, and the selected width of removed image data could be for instance up to 10 mm for each image. In general, a maximum width of removed image data could have a similar magnitude as the maximum amount of disparity, but again, this rule is just one of different feasible options. Rather, all values can be selected freely depending on the effects that are to be created.

It is to be understood that instead of a variably selected amount of removed image data, also a fixed amount of removed image data could be used. Such a fixed amount could be set, for instance, such that the artificial virtual occlusion window 701 is always placed at approximately 60% of the frontal CVS. Moving it closer to the real depth of the screen would allow less space for objects to enter and exit the scene in the frontal CVS. Moving the artificial virtual occlusion window 701 closer to the limit of the frontal CVS, in contrast, would further reduce the effective viewing space and cause slight fusion problems when fusing on the edge of the occlusion window 701, as indicated above. Hence, a compromise may be found at about 60% of the frontal CVS. It has to be noted, however, that it may equally be set to any other value and that the optimum value depends on content, display, etc. 3D movies may also have a dynamically changing content so a different optimum might be applicable.

Detecting the disparities and setting the occlusion window accordingly may be applicable in particular to still images. In a game or a movie sequence, it may be better to have a fixed occlusion window size that is suited for most of the content that will be in a 3D movie or game. It has to be noted, though, that an adjustable virtual occlusion window depth could be used with moving images as well. The adjustment might be performed gradually so that the user does not notice it consciously.

Once the optimal amount of image data that is to be removed has been determined (step 606), the left edge of the left image is cropped by the determined amount (step 607) and the right edge of the right image is cropped by the determined amount (step 608). Alternatively, the removal of image data could be realized by replacing the left edge of the left image and of the right edge of the right image by a respective strip of a predetermined color and pattern. Such a strip has a width, which corresponds to the determined amount of image data. If the predetermined color and pattern matches the color of the frame of the screen 512, fusion problems are minimized. Optionally, a thin black border could be added in addition to the left image.

The process of removing image data can be implemented for example in an algorithm alongside several other cropping and re-sizing algorithms which are employed in 3D image capture and preparation. Simple virtual depth calculations provide an appropriate number of pixels of crop for a specific display, which can be used for creating the appropriate occlusion window at the same time as carrying out other 3D image combining processes.

In addition, a thin band that has contrast to the surroundings in color or texture could optionally be added to the border of the area of both images with remaining image data, in order to increase the fusion lock (step 609).

Finally, the processed images are provided for storage in the image data section 535 of the memory 530 and/or for a 3D presentation on the screen 512, possibly after some other pre-processing operations (step 610).

In case the processed image data is to be presented on the screen 512, the processor 520 takes care of controlling the 3D display 511 accordingly, possibly via some drivers.

In the example of FIG. 7, arrow 730 represents the distance of the artificial virtual occlusion window 701 from the screen 512. This distance 730 corresponds to the allowable exit/entrance space to the right or the left of a presented scene for those objects, which are perceived to lie in front of the screen 512. Dashed lines 720 indicate the limits of the reduced display range for the left eye of an observer due to the removal of image data, while dotted lines 721 indicate the limits of the reduced display range for the right eye of an observer due to the removal of image data.

Conventionally, most scenes are designed to fall in the rear half of the comfortable viewing space to prevent window violations. Using only half the virtual space, however, results in rather flat looking 3D scenes. The introduction of the artificial virtual occlusion window allows generating 3D scenes having a greater depth range. Previously, for example, objects 712 and 716 would not have been allowed to exist in a 3D presentation, as they would have caused reverse half-occlusions. With the occlusion window 701, they now give appropriate occlusion information to the observer to be comfortably viewed.

Object 714, which is still perceived to lie in front of the artificial virtual occlusion window 701, does not cause any problems, as long as it is entirely visible. It can be comfortably moved to the front of the comfortable viewing space in the middle of the scene. The very frontal part of the CVS is rarely used to a full extent anyhow, since each human individual has different stereoscopic capabilities and so the frontal line of CVS depends on display and viewer. Even in a situation, in which the object 714 is to exit the viewing space to the left or the right at its present depth, the magnitude of the reverse occlusion will be in the order of 10% of the CVS instead of previous 70% of the CVS. Thus, it will not be as obvious and straining on the human brain as before.

In general, objects can be comfortable viewed which enter and exit the lateral sides of a scene behind the depth of the occlusion window 701. A respective area of the scene where the objects 711, 712, 715, 716 are located will only be perceived by one eye, hence no convergence information can be obtained from these objects. Still, the occlusion magnitude relative to other objects in the scene and relative to the occlusion window 701 will give good depth indicators, and the brain will fuse the 3D stereoscopic area with the 2D areas including occlusion information and other depth indicators, to give a 3D perception of the entire field of view.

Figure 8A:
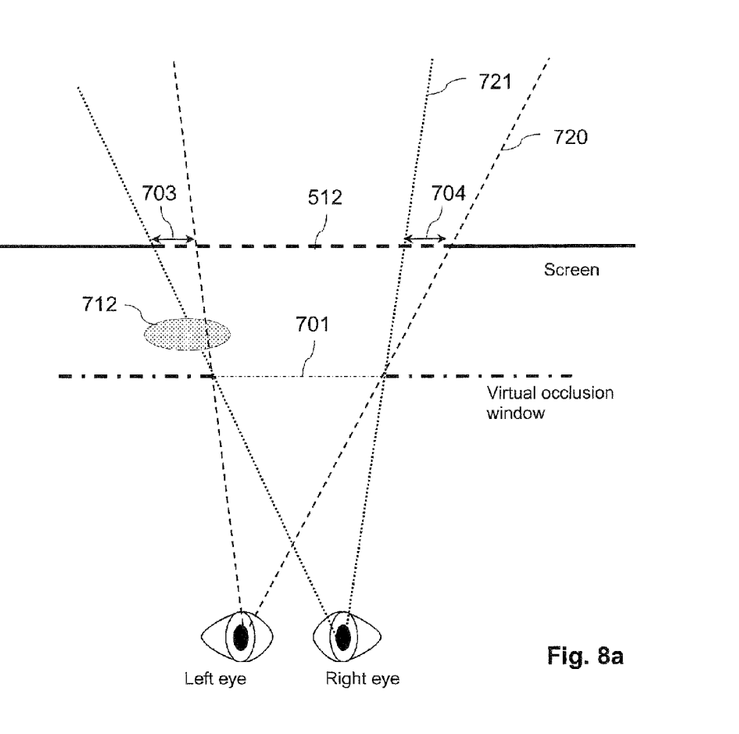
FIGS. 8a and 8b are schematic diagrams illustrating the effect of the removal of image data on the perception by an observer.
Figure 8B:
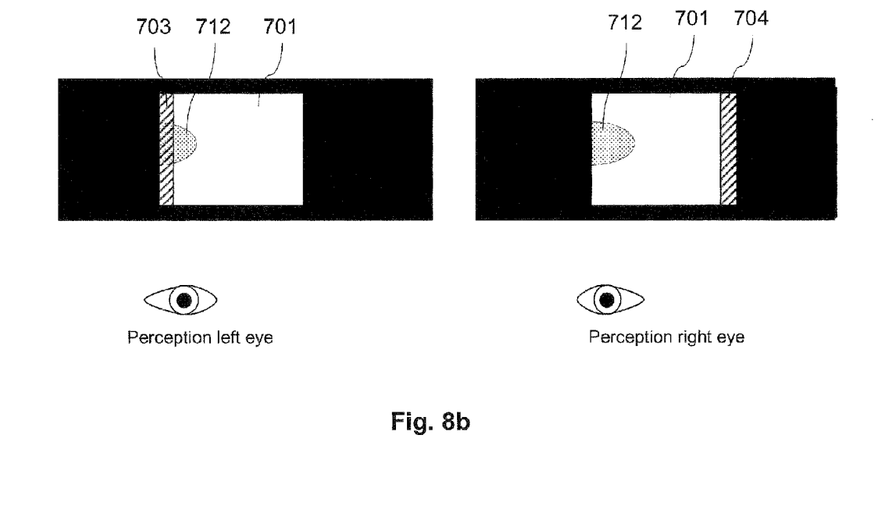

The perception by an observer is illustrated in more detail in FIGS. 8a and 8b. FIG. 8a corresponds to FIG. 7, but shows only object 712. FIG. 8b presents on the right hand side the perception of the right eye of the observer that is sent to the brain. FIG. 8b presents on the left hand side the perception of the left eye of the observer that is sent to the brain. Due to the removal of image data, a black strip 703 is added to the left edge of the left image, which is indicated in FIG. 8b by a hatched strip. The perception of object 712 by the right eye is not influenced by this, as the left edge of the right image, at which the object appears, remains unchanged. For the left eye, in contrast, the leftmost portion of the object is not visible anymore. Due to the removal of image data, a black strip 704 is moreover added to the right edge of the right image, which is indicated in FIG. 8b by a hatched strip as well. The perception of the scene by the left eye is not influenced by this, as the right edge of the left image remains unchanged. For the right eye, the rightmost portion of the scene is not visible anymore.

Removing an appropriately calculated portion of image data from the left side of the left input image and from the right side of the right input image adds an artificial disparity to the display window edge and effectively creates an artificial virtual occlusion window 701 that is closer to the observer. This window will appropriately occlude all objects entering or exiting the display space at virtual depths between the occlusion windows depth and the depth of the screen 512. This will create the illusion that the observer is looking through a window at the scene, but will not subtract from the convergence disparity information received from the scene, effectively allowing the full use of the frontal and rear virtual space without any window violations from frontal objects. This allows a more efficient use of the frontal comfortable viewing space.

Figure 9:
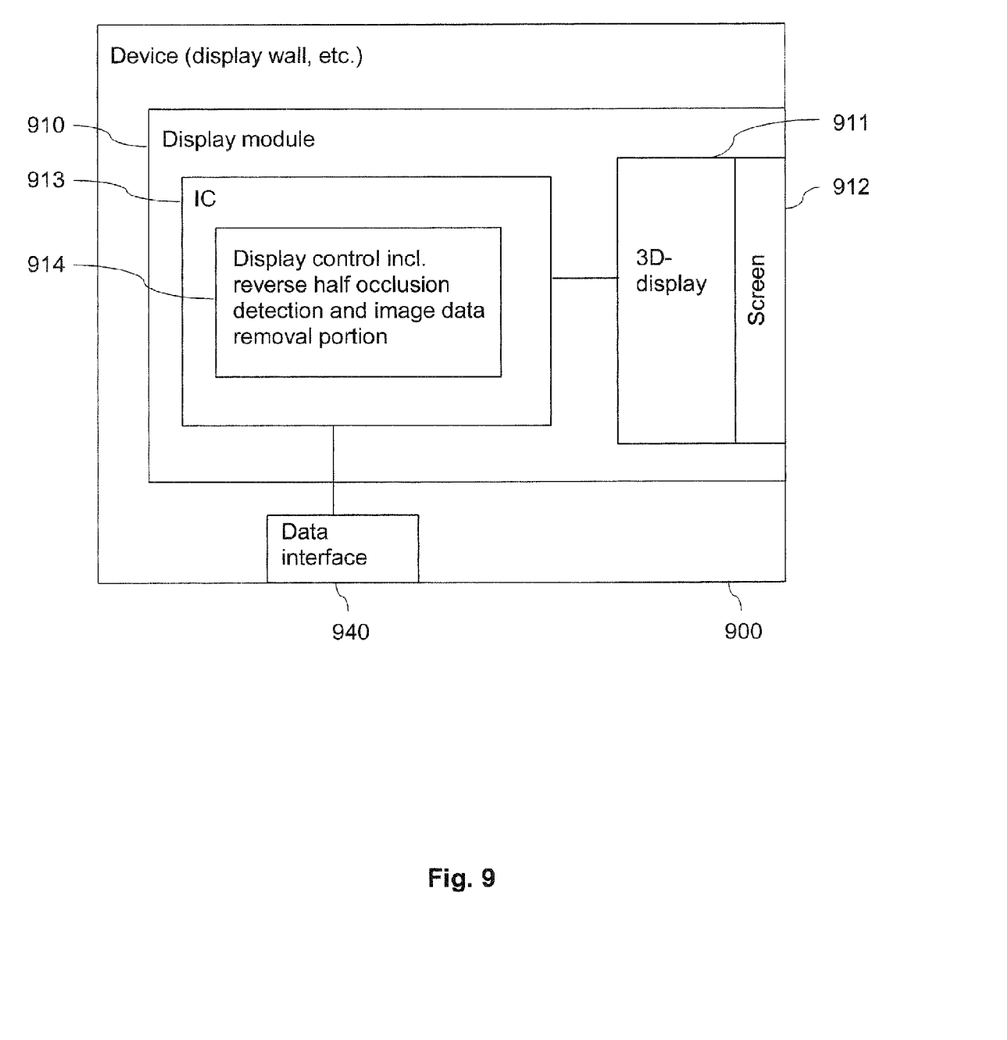
FIG. 9 is a schematic block diagram of a further device according to an exemplary embodiment of the invention.

FIG. 9 is a schematic block diagram of another exemplary device, which supports the generation of an artificial virtual occlusion window in accordance with an embodiment of the invention.

The device 900 could be for instance a 3D display wall, etc. It comprises a display module 910 including a 3D display 911 with a screen 912. The display module further comprises a chip 913, like an integrated circuit (IC), which comprises display control circuitry 914. This circuitry 914 includes a portion for reverse half-occlusion detection and image data removal. The display module 910 may comprise further components, like drivers, backlight source, etc.

The device 900 comprises in addition a data interface 940, which is linked to the display module 910.

It is to be understood that the device 900 could comprise various other components not shown.

Image data for a 3D presentation on the screen 912 may be input to the device 900 via the data interface 940. The display control circuitry 914 is configured to control the 3D display 911 based on the received image data, after having generated an artificial virtual occlusion window as described above with reference to FIG. 6. It is to be understood that the display control circuitry 914 may be configured to apply any other required kind of processing to the received image data, before the image data is used for the 3D presentation.

It is to be understood that the removal of image data could also be applied by a device, which does not comprise a screen itself.

Moreover, the functions illustrated by the processor 540 executing the computer program code 533 of the device of FIG. 5 can be viewed as means for preparing a creation of a virtual window in front of a screen, which screen is to be used for combining a left image and a right image for a three-dimensional presentation, by removing image data at a left edge of the left image and at a right edge of said right image; and as means for providing the left image and the right image for a three-dimensional presentation. Alternatively, the functions illustrated by the display control portion 914 of FIG. 9 can be viewed as such means.

Furthermore, these means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method comprising:
preparing a creation of a virtual window in front of a screen, which screen is to be used for combining a left image and a right image for a three-dimensional presentation, by removing image data at a left edge of said left image and at a right edge of said right image;
providing said left image and said right image for a three-dimensional presentation;
selecting for said removal of image data an amount of image data, which results in a predetermined perceived depth of said virtual window; and
using a predetermined perceived depth of said virtual window, which corresponds to a value in a range of up to 80% of a maximum allowed disparity for said screen.

2. The method according to claim 1, further comprising:
detecting whether said left image and said right image represent an object that would be perceived in front of said screen in said three-dimensional presentation; and
preparing a creation of a virtual window in front of said screen only in case a representation of such an object is detected.

3. The method according to claim 2, further comprising detecting whether such an object would touch an edge of said screen in said three-dimensional presentation and preparing a creation of a virtual window in front of a screen only in case such an object touching an edge of said screen is detected.

4. An apparatus comprising at least a processor, and a memory in communication with said processor and having computer coded instructions stored therein, said instructions when executed by the processor being configured to cause the apparatus to perform:
preparing a creation of a virtual window in front of a screen, which screen is to be used for combining a left image and a right image for a three-dimensional presentation, by removing image data at a left edge of said left image and at a right edge of said right image;
providing said left image and said right image for a three-dimensional presentation;
selecting for said removal of image data an amount of image data, which results in a predetermined perceived depth of said virtual window; and
using a predetermined perceived depth of said virtual window, which corresponds to a value in a range of up to 80% of a maximum allowed disparity for said screen.

5. The apparatus according to claim 4, wherein said instructions are further configured to cause the apparatus to perform: removing said image data by replacing a left edge of said left image and a right edge of said right image with a respective strip of a predetermined color and pattern.

6. The apparatus according to claim 4,
wherein said instructions are further configured to cause the apparatus to perform: detecting whether said left image and said right image represent an object that would be perceived in front of said screen in said three-dimensional presentation; and
preparing a creation of a virtual window in front of said screen only in case a representation of such an object is detected.

7. The apparatus according to claim 6, wherein said instructions are further configured to cause the apparatus to perform: detecting whether such an object would touch an edge of said screen in said three-dimensional presentation, preparing a creation of a virtual window in front of a screen only, in case such an object touching an edge of said screen is detected.

8. The apparatus according to claim 6, wherein said instructions are further configured to cause the apparatus to perform: selecting for said removal of image data an amount of image data, which increases with an increasing perceived distance of said object to said screen.

9. The apparatus according to claim 8, wherein said to instructions are further configured to cause the apparatus to perform: limiting said amount of image data to a predetermined value.

10. The apparatus according to claim 4, further comprising a display including said screen, said display being configured to present a three-dimensional presentation, which combines at least a left image and a right image.

11. The apparatus according to claim 10, wherein said display is one of a stereoscopic display and a multi-view display.

12. The apparatus according to claim 10, wherein said display is a multi-view display and wherein said processor is configured to harmonize a removal of image data for all views of a multi-view presentation on said multi-view display.

13. The apparatus according to claim 10, wherein said display belongs to a display wall comprising multiple seams.

14. The apparatus according to claim 4, wherein said apparatus comprises at least one of:
a display module;
a chip;
a device comprising a display module;
a device comprising a user interface;
a mobile phone; and
a laptop.

15. A computer program product comprising a non-transitory computer readable storage medium having computer coded program instructions stored therein, said instructions realizing the following when executed by a processor:
preparing a creation of a virtual window in front of a screen, which screen is to be used for combining a left image and a right image for a three-dimensional presentation, by removing image data at a left edge of said left image and at a right edge of said right image;
providing said left image and said right image for a three-dimensional presentation;
selecting for said removal of image data an amount of image data, which results in a predetermined perceived depth of said virtual window; and
using a predetermined perceived depth of said virtual window, which corresponds to a value in a range of up to 80% of a maximum allowed disparity for said screen.

16. The computer program product according to claim 15, said instructions further realizing the following when executed by a processor:
detecting whether said left image and said right image represent an object that would be perceived in front of said screen in said three-dimensional presentation; and
preparing a creation of a virtual window in front of said screen only in case a representation of such an object is detected.

17. An apparatus comprising:
means for preparing a creation of a virtual window in front of a screen, which screen is to be used for combining a left image and a right image for a three dimensional presentation, by removing image data at a left edge of said left image and at a right edge of said right image;
means for providing said left image and said right image for a three-dimensional presentation;
means for selecting for said removal of image data an amount of image data, which results in a predetermined perceived depth of said virtual window; and
means for using a predetermined perceived depth of said virtual window, which corresponds to a value in a range of up to 80% of a maximum allowed disparity for said screen.

* * * * *

UNITED STATES PATENT AND TRADEMARK OFFICE
CERTIFICATE OF CORRECTION

PATENT NO. : 8,587,638 B2  Page 1 of 1
APPLICATION NO. : 12/311303
DATED : November 19, 2013
INVENTOR(S) : Lachlan Pockett It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1259 days.

Signed and Sealed this
Twenty-second Day of September, 2015

Michelle K. Lee
*Director of the United States Patent and Trademark Office*